Nov. 12, 1929.  R. W. WILSON  1,734,988
FLEXIBLE SHAFT COUPLING
Filed July 12, 1924    3 Sheets-Sheet 1

INVENTOR
Ramsay W. Wilson
BY
Philip Farnsworth
ATTORNEY

Nov. 12, 1929.  R. W. WILSON  1,734,988
FLEXIBLE SHAFT COUPLING
Filed July 12, 1924   3 Sheets-Sheet 2
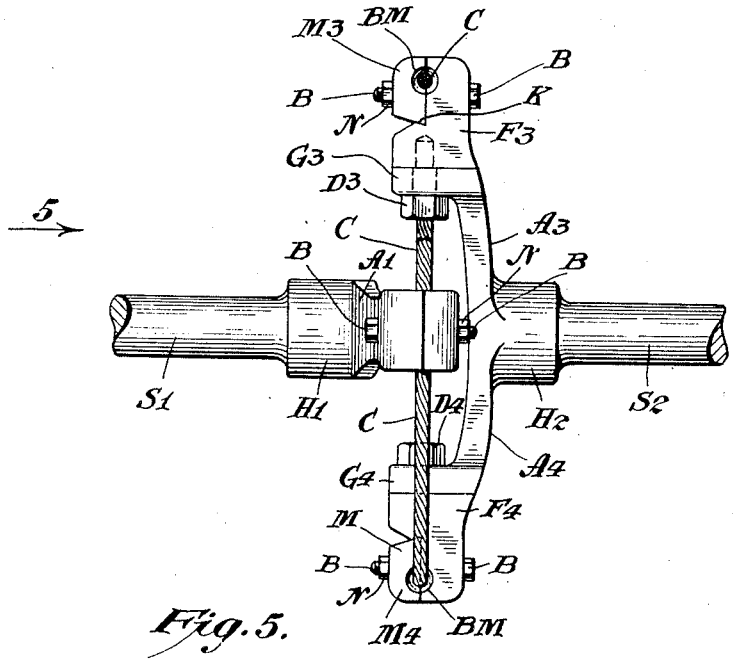
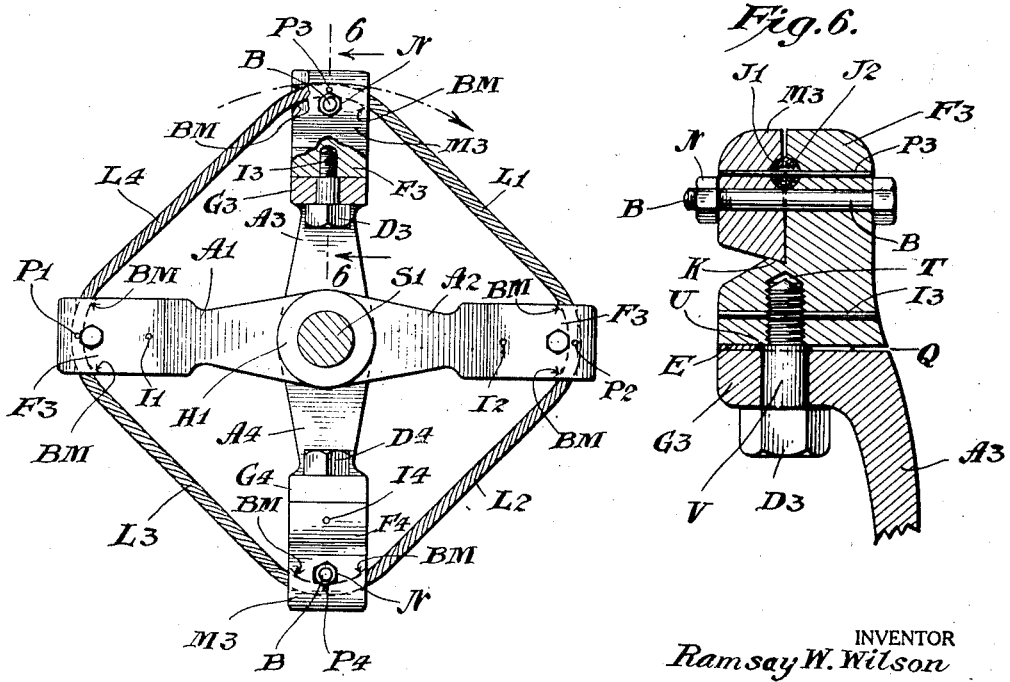
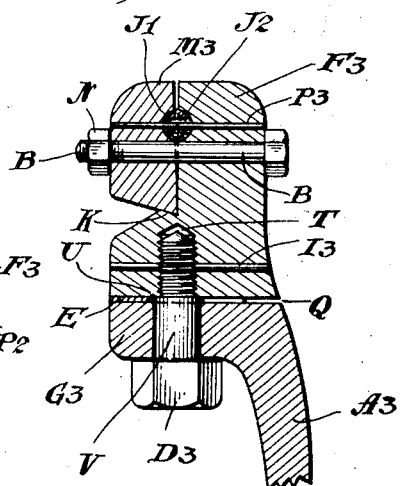
INVENTOR
Ramsay W. Wilson
BY
Philip Farnsworth
ATTORNEY Nov. 12, 1929.    R. W. WILSON    1,734,988
FLEXIBLE SHAFT COUPLING
Filed July 12, 1924    3 Sheets-Sheet 3
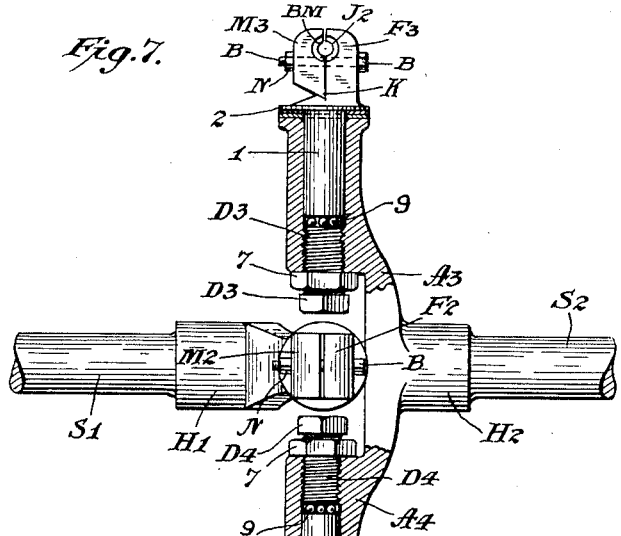
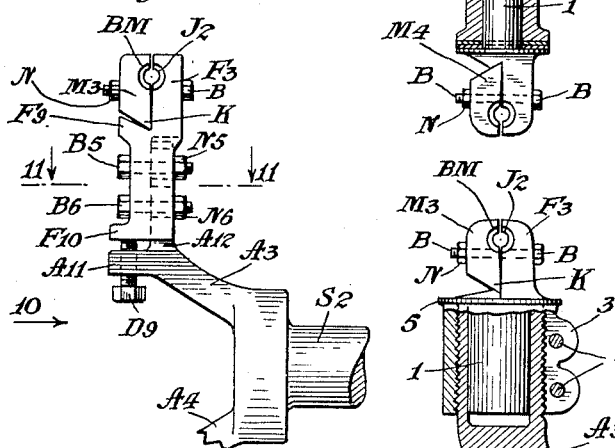
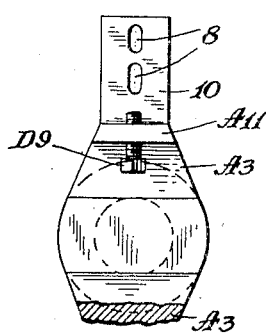
INVENTOR.
Ramsay W. Wilson
BY Philip Farnsworth
ATTORNEY.

Patented Nov. 12, 1929

1,734,988

UNITED STATES PATENT OFFICE

RAMSAY W. WILSON, OF NORTH PLAINFIELD, NEW JERSEY

FLEXIBLE SHAFT COUPLING

Application filed July 12, 1924. Serial No. 725,553.

This invention relates to flexible couplings for rotary shafts, of substantially indestructible character.

The object of the invention is the simplest possible form of operative flexible shaft coupling and one which is substantially frictionless.

The invention consists of a coupling for the adjacent ends of rotary shafts, said coupling comprising one or all of the characteristic and novel features described hereinafter.

For a long period, the desirability has been recognized of a practical embodiment of shaft coupling consisting chiefly of driving links of some such construction as a stranded wire cable. Long ago such constructions were proposed in which an endless cable, in the form of a ring, had its driving links in the forms of arcs of a circle. Later it was proposed to modify such impracticable device by enclosing the driving links of the cable in connection tubes of rigid material, and by providing a ball joint between the adjacent coupled shaft ends. Such proposed modification, however, constituted, by virtue of the rigid enclosures of the cable arcs, a departure from the desired simplicity of a coupling comprising only free cable links between the supports for the cable. Thus it seemed impracticable to employ a flexible cable in a shaft coupling.

I have discovered, however, that the original proposed simple form of a cable link coupling (such for example, as that of British Patent 7,696 of 1885) may be made operative and practical, without the addition of any rigid enclosures for the cable links, and without the provision of any ball joint between the adjacent shaft ends (such as those disclosed, for example, in United States Patent to Augustine, No. 1,010,717 of 5 December 1911); and indeed substantially without the employment of any parts additional to the flexible cable driving links themselves and the means for securing separated portions of the cable to the adjacent shaft ends, so that nothing exists save the cable links themselves between successive isolated supporting points for the cable.

The resulting very useful and practical coupling is obtained, among other features, by making the cable links straight instead of arcs of circles, especially in connection with the various other improvements described hereinafter and illustrated in the drawings in which Figures 1-3 (Sheet 1) show one embodiment of the invention and Figs. 4-6 (Sheet 2) show a second embodiment.

Fig. 4 is a side elevation of the second embodiment, Fig. 5 being an end view of Fig. 4 as indicated by the Fig. 4 arrow 5, and Fig. 6 an enlarged section of Fig. 5 on line 6—6, showing the details of one of the clamping means.

Fig. 7 is a side elevation, partly in section, of a third embodiment.

Fig. 8 is a section, partly in elevation, of a portion of a fourth embodiment.

Figs. 9-11 show a fifth embodiment, Fig. 9 being a side elevation of a portion of the device; Fig. 10 being a front elevation looking with the arrow of Fig. 9, and Fig. 11 being a section at 11—11 of Fig. 9 looking down with the arrows.

In all the figures are shown the rotary shafts S1, S2 to be coupled, the flexible coupling ring or endless cable C, and the two devices by which the cable is connected to the shafts, each such connecting device comprising a pair of radial arms A and hubs H1, H2, the sides or quadrants of the cable ring being secured to the shafts by any suitable means such as keys or splines (not shown), at the hubs, and the ends of the arms A, carrying cable C, being centered about the hubs. The two arms A of each connecting device are in alinement with one another, and such alinement of one device is at right angles to the like alinement of the other connecting device. Successive separated portions of cable C are carried by the ends of the four arms A. If desired, for greater driving efficiency, each connecting device may comprise arms forty-five degrees apart instead of ninety degrees as shown. Nothing of the above, broadly speaking, is claimed as novel, save as to the straight-sided cable and the improvements hereinafter described and claimed. This type of coupling permits both end play of the coupled shafts and all eccentric movements of the adjacent shaft-ends.

Cable C preferably is a stranded metallic wire endless cable or ring or a fibrous stranded endless cable or ring, made in a manner to be described hereinafter. After being manufactured in the form of a ring, the ring is shaped to the form shown (Figs. 2 and 5) by expanding the ring by means of a suitable forming apparatus located within the periphery of the ring, said device being expanded radially outwardly against the ring. In that shape, the ring is slid from off the forming device on to and over the four compressing bolts or rivets B (in the form of Figs. 1-3, double-headed rivets may replace the bolts shown). By the operation of the above forming device, the entire ring is placed under an initial tension until it assumes the shape shown. It is held in that shape by the forming device until it is placed in the position shown in Figs. 2 and 5, in which position it is permanently held in said desired shape by the clamping devices shown. By this method, involving initial and permanent tensioning, all liability to buckling under service conditions is avoided.

In the several forms shown, the cable C in assembly is clamped (as by bolts or rivets) between two clamping means M and F carried by arms A (see M3, F3 in Figs. 3 and 6-9). The principal difference between the embodiment of Figs. 1-3 and the preferred forms of Figs. 4-11 is that the latter are constructions (involving making certain members separate from arm A3) which permit assembly adjustment of the apparatus to adapt the supporting means to different cable ring sizes. (It is impracticable to make a number of cable rings all of exactly the same length or size.) Said constructions also relieve the cable ring of certain strains which will be described. The following description applies to all figures.

Figure 2:
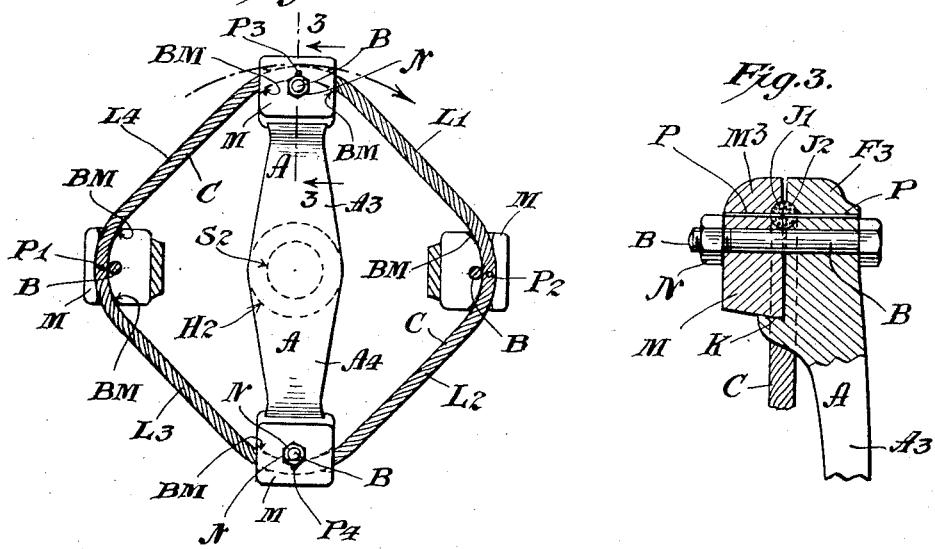
Fig. 2 a vertical section through Fig. 1 on line 2—2.

Clamp members M3 and F3 (exemplifying all four pairs of clamp members on the ends of the four arms A) are constructed with semi-cylindrical grooves J1, J2 to receive cable C. These grooves are curved as shown (Figs. 2 and 5) and are so located that in the case of a cable ring of a given size, clamped in operating position, the quadrants L1—L4 of the "ring" will be straight as shown in Figs. 2 and 5. Cable ring C, prior to its assembly in the clamps, is shaped to this form, including the rounded ends shown, in a suitable mechanical former (not shown) wherein it is subjected to mechanical forces, preferably without the application of heat, such as to cause it to assume such shape, i. e., with straight sides and rounded corners. While cable C (the construction of which is to be described in detail hereinafter) is sufficiently flexible for its use in the invention, yet it will hold said pre-formed shape sufficiently to facilitate its assembly in the grooves of the clamping devices. Thereafter the clamping means will hold the pre-shaped cable permanently in substantially the shape in which it was formed, with straight sides and rounded corners, save for the flexibility permitted by the cable quadrants between the clamping supports. The resulting straight-sided cable quadrants are such as to secure a positive driving means, without buckling of the quadrants and consequent undue strains thereon (as if they were arcs of circles), and yet the stranded cable construction of the quadrants between the supports is such as to provide all desired flexibility to follow the various movements of the ends of the coupled shafts. In this invention, as will be seen, there are no rigid connecting means auxiliary to the cable and extending with the cable between the ends of the radial supporting arms.

The novel method of assembling the cable ring and its supports (consisting of pre-shaping the cable to have straight sides and rounded corners), prior to its insertion in the supporting grooves or clamps, possesses important practical advantages. First, in the embodiment of Figs. 1-3, it permits a cable ring having a size exactly suitable to fit the clamping supports, to be inserted therein in a very convenient manner, avoiding all manual attempts to force parts of the cable ring into their grooves in the clamping means. And although it not practicable to make all rings to exactly the same size, yet in the case of Figs. 1-3 it is quite practical to select completed cable rings of the exact size required for the clamping construction shown. Second, in the embodiments of Figs. 4-11 (wherein constructions are provided to adapt the location of the clamping means to cable rings of slightly varying sizes) such method of pre-shaping the cable ring has a similar advantage in facilitating assemblage, and also in obviating the necessity of experimenting with shims E (Fig. 6) of varying thicknesses before succeeding in obtaining a shim of proper thickness to cause the preservation of the proper straight-sided shape of the cable ring, by forcing the rounded corners of the ring radially outward.

The clamping members M3 and F3 (Figs. 3 and 6-9) are formed with a dovetail fulcrum seat K whereby the lower right-hand corner of clamping member M3 fits in member F3 as shown. These two clamping members also are constructed with alined holes to receive clamping bolt or rivet B.

The entire coupling first is assembled independently of shafts S1, S2, and when completed is connected with the shafts by hubs H1, H2.

In the assembly of the coupling, the clamping or compressing members B (as bolts or double-headed rivets) are passed through the holes in clamp members F (from right to left, Figs. 3 and 6–9.) This is before clamp member M3 is slid over the left-hand projecting end of the bolt or rivet B. Then the pre-shaper or former (not shown) for the straight-sided (quadrants), round-cornered cable ring is moved to a position alongside the four bolts B and the cable ring then is slipped from off the shaper over said bolts and toward and into groove J2 in clamp member F3. Bolts B are located next radially inside of curved cable groove J2, and preferably at the mid-points of the curvatures of the grooves, and preferably adjacent the grooves, to facilitate the transfer of the pre-shaped cable from its former to and around the four bolts and toward and into groove J2, so that the cable is supported on the bolt and in the semicircular groove J2 pending the application of clamping member M3. Next, member M3 is slipped over the end of bolt B, and as it engages cable C there is a space between it and clamp member F3, which space is wider at points more remote radially from the dovetail fulcrum seat K. This space allows very effective clamping by the application of nut N to bolt B to compress cable C securely between clamping members M3 and F3, the compressing and clamping action working against seat K (see Figs. 3 and 6–9).

As shown in Figs. 2 and 5, the grooves in the four pairs of clamping members (of all embodiments shown) are curved to receive the four pre-shaped rounded corners of cable ring C. The above-described clamping is effective at the middle of each of the four rounded corners of the cable ring, at separated points of the entire cable ring, leaving the intervening quadrants of the cable entirely free for the flexible coupling action. The quadrants L1—L4 of the ring are held permanently straight substantially as pre-shaped in the former, being so held permanently by means of said successive pairs of clamping members. The clamping means described is sufficient under ordinary conditions to hold the cable ring in place without slippage during driving. If desired, a pin P (Figs. 3 and 6) may be driven through holes in clamp members M3 and F3 and through the cable C for the purpose of absolutely ensuring against slippage of the cable under the forces exerted during driving operations. In some cases, the advantages of such pins P may discount the fact that usually, when using the pins, it is probable that one strand of the cable will be cut by the forcing of the pin through the cable.

Also, as shown in Figs. 2, 5 and 7–9, the ends of the cable grooves in the clamps have bell mouths or are flared at BM. This ensures against any abrasion or wear on the cable at the points where its straight quadrants pass into the curved grooves of the clamps.

Cable C preferably is a stranded endless cable, comprising metal wires or fibrous strands, or fiber-clad metal wires or strands. If metallic, it might be made of strands spliced or soldered together. But because in the novel combination hereof it is desirable to provide a cable which will stretch as little as possible (to preserve its pre-shaped form), it is preferred to make the cable ring of a continuous strand of wire or of fiber wound into an endless rope of the so-called grommet type. When metal wires are employed, drawn wire is preferable to rolled wire in this invention, because of superior physical qualities to withstand the strains to which the apparatus of the invention is subjected in service; said qualities comprising tensile strength, elasticity, torsional resistance and flexibility. Preferably the cable, if metallic, should not include any soldered connections, because heating injures the drawn metallic wires; and preferably heat should not be used in pre-shaping the ring to the form shown in Figs. 2 and 5 (with straight sides and round corners) because such heating would be likely to draw the temper of the metal and might reduce the strength of a steel cable as much as forty per cent.

An example of a grommet suitable for combination in this invention is as follows. The cable or wire rope may be, say, of three-eighths inch diameter and may be what is known as a "7 x 19 wire rope grommet"; that is, the single strand is laid next to itself seven times and the strand consists of nineteen small metal wires. This grommet type cable ring is the most nearly non-stretchable of any wire rope ring. This grommet is made as described in United States patents to Carnagy 654,224–5 of 24 July, 1900, and in accordance with well-known practice of wire rope engineering. The grommet is made of a single open-ended strand. Part of the strand serves as the core for the cable and the rest of the length of the strand serves as the helically wound covering for the core. A given strand differs from other strands in the number of individual wires composing it and in the size of such individual wires; and there may be different sizes of wires in the same strand. For a given diameter of cable or wire rope, great flexibility of the cable is obtained by using a large number of smaller wires in the strand. If one metal wire were used in lieu of the strand of several wires, the cable might be too stiff for convenient pre-shaping to the form of Figs. 2 and 5; and in a strand having a very large number of wires, the wires might be so small as to result in rapid wear. Hence, it is preferable to have several wires in the strand but not too many.

Following are descriptions of the several embodiments shown.

Figure 1:
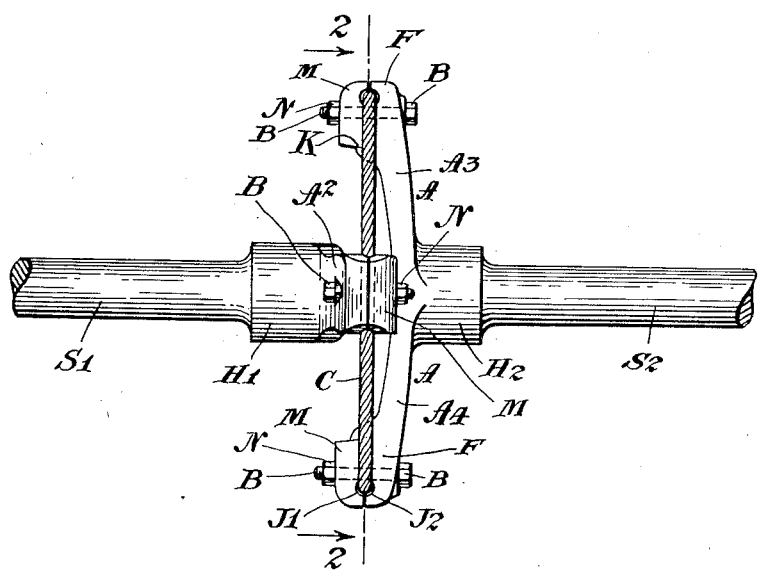
Fig. 1 is a side elevation of one embodiment in a flexible coupling between two rotary shafts.
Figure 3:
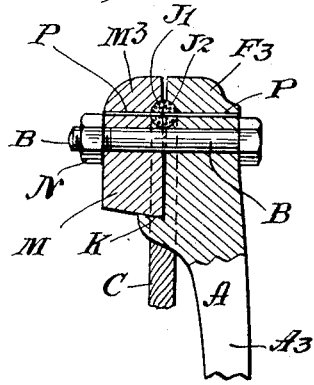
Fig. 3 an enlarged section of Fig. 2 on line 3—3 showing the details of one of the four clamping devices.

In the form of Figs. 1-3, clamp members F (F3, Fig. 3), with the fulcrum seat K therefor, are formed integral with arms A (A3, Fig. 3). But in the form of Figs. 4-11, said clamp members F (F3) are independent of the supporting arms, in connection with a general construction which provides such radial locating of said clamping members as will cause the sides (L1—L4) of a given cable ring to be held straight in operation, even if such given ring departs more or less from exact desired length owing to the impracticability in manufacturing the ring, of producing it to have an exactly predetermined length. For example, arm A3 (Fig. 6) is formed with a rim G3. The outer surface of rim G3 and the adjacent surface of separate clamp F3 are parallel to one another and both are substantially tangent to a circle, the center of which is the center of hub H2 (Fig. 4). The independency of clamp member F3 and rim G3 permits insertion between them of a shim E which locates member F3 radially further from the driving center. In the factory is a stock of shims E of various standard thicknesses. All other elements of the given designs of coupling are of uniform standard dimensions. When a given cable ring C is slipped over on to four bolts B and toward grooves J2 in clamp member F3, then if such ring is seen to be a little too large, shims E of suitable thickness are inserted to locate clamp member F3 further from the center, so that the rounded corners of the cable will fit in the groove J2 and lie sufficiently remote from the center to preserve sides L1, L4 of the cable with their straight lines. On the other hand, if a given cable ring C is too small, shims E of less thickness are inserted, to locate clamp member F3 nearer to the center of the cable ring and permit its rounded ends to enter groove J2 while causing the sides L1—L4 of the ring to lie straight between the rounded corners. When clamp members F (F3, Fig. 6) thus are radially positioned to assemble cable ring C properly, then clamp members M (M3, Fig. 6) are applied and nuts N are tightened up on them as also in Figs. 1-3 (and, of course, if desired, lock nuts, not shown, may be applied). Meanwhile clamp members F (F3, Fig. 6) have been held in place on arm-rims G (G3, Fig. 6) by bolts D3. These bolts have a cylindrical portion V having a length equal to the rim G3. To receive these bolts D, clamp members F are tapped as shown, Fig. 6, to a distance greater than the length of the threaded ends of the bolts, to provide a clearance T for the said threaded ends. A shim E of suitable thickness is inserted in space Q by radially pulling out clamp member F3 and thrusting the shim between F3 and G3 around the bolt D3. As is shown, the bolts D are located so that a line through their centers extends through the center of the rounded corner of cable C as the latter lies between the clamp members, so that each bolt acts as a pivot for a clamping structure which it secures to arm-rim G3. Freedom of motion on such pivot is permitted by bolt-clearance T and by the flat adjacent turning surfaces bounding the space Q; and such flat surfaces may be greased as by a suitably located grease cup not shown. Thus, in the operation of the coupling, when a force acts on a rounded corner of cable C which would tend to put it under possibly undue strain if the clamping means were rigid, the clamped structure yields and oscillates on bolt D3 as a center or pivot. This construction, especially in connection with the flares or bell mouths BM at the ends of the grooves through the clamping means, provides means permitting free movement of the supported rounded portions of cable C without undue strains or wear on the cable, thereby constituting a very practical form of the cable ring type of coupling.

Pins I (I3, Fig. 6) may be driven as shown to anchor the clamping means and bolts D together so that the bolts oscillate with the clamping means. These pins I, as shown, are driven through holes bored through clamp member F and the bolts D.

In production, the cable rings of various slightly different sizes are classified and coordinated with the shims E of various slightly different thicknesses, thereby avoiding experimentation in assembly. Thus, when a given cable ring C is to be assembled, the shims E will be applied in the first instance which will have a thickness appropriate to the size of that particular cable ring, i. e., such thickness as to locate the clamping means in the position in which the cable ring will fit in the clamping grooves and its sides L1—L4 will lie permanently in straight lines as shown in Fig. 5.

The above constructions (best exemplified in Fig. 6) additional to the showings of Fig. 3) provide not only a means of assembling properly cable rings of slightly different sizes, but also a means of relieving the cable ring of undue strains during its tortuous movements in service, while yet permitting proper supports for the ring.

Figs. 7-11 illustrate other embodiments of the modification of Figs. 4-6 wherein the slightly varying sizes of cable rings manufactured to be as nearly the same size as possible, are assembled to have permanently straight sides and yet also have the desired freedom of movement of the ring-sides to yield to movements of the coupled shafts.

In Fig. 7, showing one of these embodiments, clamp member F3 is separate from arm A3 (as in Figs. 4-6), but is integral with a shank 1 slidable radially in arm A3, so that clamp member F3—1, although adjustably movable radially with respect to arm A3, yet is very rigidly and strongly combined with arm A3. Bolt D3 engaging interior threads in the wall of the hole in arm A3 which receives shank 1 is adjusted radially to locate groove J2 properly to receive the cable ring. (All the arms of the coupling are similarly equipped.) After the cable ring is assembled in the groove J2 of the clamp members of all the coupling arms, lock nut 7 is screwed down to hold the clamping member F3 in its outer position suitable for maintaining the cable ring in straight-sided form. In such position, an annular flat space 2 is formed between member F3 (around shank 1) and the end of arm A3. In this space may be placed a split V ring or felt washer as shown, to retain lubricants and keep out dust. This construction involves freedom of pivotal motion of clamp-member F3—1 relative to the end of arm A3, under motion of the straight-sided cable ring induced by shafts S1, S2, and in this respect is similar to Figs. 4–6; although the construction of Fig. 7 is much stronger and adapted for heavier service. Between the adjacent ends of shank 1 and bolt D3, I prefer to place steel bearing balls 9.

In Fig. 8, as in Fig. 7, there is a shank 1 integral with clamp F3 and entering a hole in the end of arm A3. But here, instead of an internal bolt D3 as in Figs. 4–7, there is a split internally threaded collar 3 radially adjustable on the exterior threaded sides of the end of arm A3. Collar 3 presses up against a rim 5 of clamp F3, and thereby forces the latter and its shank 1 outwardly to position to receive the cable ring of definite size. After such ring is in place in the grooves, bolts or screws 4 are tightened to hold collar 3 tight on arm A3. In this construction, as in that of Figs. 4–7, clamp F3 is free to move pivotally on the end of arm A3. When collar 3 is screwed outwardly, it encloses the space thereby formed between clamp F3 and the end of arm A3, so that it is unnecessary to insert a washer as in the space 2 of Fig. 7. In Fig. 8, as in Fig. 7, the pivotal action of F3 is about the shank 1, which is a stronger construction than that of Fig. 6.

In Figs. 9–11, a strong construction for heavy duty is provided, although lacking the pivotal mounting of clamp member F3 as in Figs. 6, 7 and 8. As shown in Fig. 11 (which is a section and plan looking down at 11—11 of Fig. 9), the clamp member F3 is formed to surround three sides of a shank portion 10 of arm A3. In Fig. 10 (a view looking with arrow 10 of Fig. 9), arm A3 and its shank portion 10 are shown alone, the clamping members F3 and M3 of Fig. 9 being removed. Shank 10 (Fig. 10) is formed with bolt-holes 8 which are oblong in a radial direction from the center of the coupling outwardly. Clamp F3 is slidable radially along shank 10 of arm A3; and is pushed out by bolt D9 in part A11 of arm A3. The end of bolt D9 engages a part F10 of clamp member F3. When F3 is pushed out to exactly the position to receive in its groove J2 a cable ring of a specific size, bolts B5, B6 (Fig. 9) are secured through the oblong holes 8 of shank 10 (Fig. 10) to hold member F3 in such position. The construction of Figs. 10–11 is less expensive than that of Fig. 8, and is satisfactory in all cases where pivotal action of member F3 is not required.

The general advantages of the invention include the following. The disclosed improvements upon the prior proposals of cable ring couplings constitute means whereby such a coupling for the first time is made practical. The invention provides in a practical form all the advantages heretofore only theoretically possible in a coupling of this general type. The straight quadrants of the cable permitted by the novel construction provide practical positive driving means, and yet the necessary flexibility is obtained by the straight quadrants between supports owing to the yielding nature of the cable; and all without any buckling of or any undue strains on the cable quadrants between supports. The flexibility of the cable, as to its quadrants between supports, is such that it conforms to all motions of the ends of the coupled shafts. The ends of the supporting arms and the clamping means mounted thereon are free to follow all movements of the shaft ends without undue strains on any portion of the cable; and in the embodiment of Figs. 4–8 such clamping means is free to move independently of the supporting arms, so that when a movement of one end of one shaft pulls certain rounded corners of the cable ring out from the normal plane of the ring, then the clamping means may follow such movements around the pivotal centers, thereby preventing strains on the cable. The utmost of flexibility of the coupling is provided owing to the fact that the cable quadrants between the supporting arms constitute the only connection between the respective shafts and the supporting points of the cable separated from one another. Ample end play of the shaft is permitted, due to such flexibility. The invention is admirably adapted for use in motor cars for location between the gear box and the differential,— a location where other constructions would be liable to injury and deterioration. Wherever desired, two of the new couplings may be used in series, with oppositely disposed supporting arms, where it may be desired to permit greater end play of the coupled shafts than is possible with a single coupling, as, for example, to permit throwing out the clutch in a motor vehicle.

The metal comprising the wires used in the cable of this invention is preferably and usually steel, on account of its strength, but it may be Monel metal, phosphorous bronze, silicon bronze, or any other metallic alloy. Or it is sometimes desirable to use fibrous grommets such as those made of cotton, hemp or other fiber strands; or even grommets of metal wire strands clad with fiber or hemp.

I particularly point out and distinctly claim the part, improvement, or combination which I claim as my invention or discovery, as follows:—

1. A coupling comprising supporting arms, clamping members successively carried thereby, each of said clamping members being constructed with a curved groove and having a dovetail fulcrum seat; in combination with a straight-sided stranded cable ring having rounded corners located in the curved grooves of said clamping members; and compressing members holding said clamping members on their seats against the portions of said cable in said grooves.

2. A coupling comprising supporting arms, clamping members successively carried thereby, each of said clamping members being constructed with a curved groove; in combination with a straight-sided stranded cable ring having rounded corners located in the curved grooves of said clamping members; and compressing members located adjacent the inner portions of the rounded corners of said ring, extending through said respective clamping members and holding the latter against the rounded corners of the cable ring in said grooves.

3. The method of making a coupling of the type comprising a stranded cable ring supported in clamping devices having curved grooves, said method consisting first in pre-shaping the cable ring, prior to assembly with its clamping devices, to have straight sides and rounded corners, then placing the rounded corners, of the cable ring so shaped in the curved grooves of the clamping devices; and finally clamping the rounded corners of the pre-shaped cable in said grooves.

4. A coupling comprising supporting arms, clamping members successively carried thereby, each of said clamping members being constructed with a curved groove and having a dovetail fulcrum seat; in combination with a straight-sided stranded cable ring having rounded corners located in the curved grooves of said clamping members; and compressing members located adjacent the inner portions of the rounded corners of said ring; extending through said respective clamping members and holding the latter against the rounded corners of the cable ring.

5. A coupling comprising supporting arms, clamping means carried thereby and constructed wtih curved grooves having flared end portions, and a straight-sided, round-cornered stranded cable ring, the round corners of which are held by said clamping members in the grooves thereof.

6. A coupling comprising supporting arms, clamping means carried thereby, a straight-sided, stranded cable ring having rounded corners engaged by said clamping means; and pins extending through said clamping means and cable ring and securing the same together against slippage.

7. A coupling comprising supporting arms, a plurality of clamping devices pivotally carried by said arms and constructed with curved grooves having flared end portions; and a straight-sided stranded cable ring having rounded corners held by said clamping devices in the curved grooves thereof.

8. A coupling comprising supporting arms, clamping devices pivotally carried thereby, and a straight-sided stranded cable ring, separated portions of which are secured by said clamping devices.

9. A coupling comprising supporting arms; pairs of clamping members one member of each pair being secured to one of said arms, and the two members of each pair having a dovetail fulcrum seat; a stranded cable ring having separated portions located between the two members of each pair of clamping members; and compressing means holding the said cable ring in position in said clamping member pairs.

10. A coupling comprising supporting arms; a plurality of pairs of clamping members, a bolt securing one member of each pair to a supporting arm, said bolt having a threaded end engaging in said clamping member, and the latter being tapped to provide clearance for said threaded bolt-end; a shim between said bolted clamping member and the arm to which it is secured by the bolt; and a straight-sided stranded cable ring having rounded corners which are located in said clamping members.

11. A coupling comprising supporting arms, a stranded cable ring, and cable-holding devices radially adjustable with respect to and pivotally carried by said arms.

12. A coupling comprising supporting arms, a stranded cable ring, and holding devices for said ring mounted on said arms on a pivot in line with the normal plane of said ring.

13. A flexible coupling which comprises radially arranged supporting arms, cable-holding devices, a stranded cable ring having rounded corners supported in and by said holding devices; said holding devices being located at the ends of said radial arms and provided with means permitting them to be secured thereto in different radial positions, whereby a given flexible cable ring may be held in straight-sided form.

14. A coupling comprising supporting arms, pairs of clamping members, one of each pair of which is pivotally mounted in one of said arms; a stranded cable ring having separated portions carried in said pairs of clamping members; and compressing devices holding together the respective pairs and clamping members with said portions of the cable ring between them.

15. A coupling comprising a stranded cable ring, supporting arms, and cable-holding devices; each cable-holding device being connected to a supporting arm by way of a member pivoted in the end of its supporting arm, the center of said pivoted member being located in the plane of the cable ring and permitting oscillation of the cable-holding devices by service movements of the cable.

16. The method of making a coupling of the type including a stranded cable ring supported at circumferentially separated portions by a plurality of separate clamping devices having curved grooves, said method consisting in expanding the ring at such separated portions, prior to its assembly with the clamping devices, to a shape having rounded corners conforming with the curvature of said grooves and having straight sides between said corners; and then assembling such pre-shaped ring with its clamping devices by forcibly maintaining its pre-shaped condition while slipping it into place in the grooves in the clamping devices, whereby its shape is maintained permanently.

17. The method of making a coupling of the type including a flexible stranded cable ring supported at circumferentially separated portions by a plurality of clamping devices having curved grooves and transverse bolts adjacent the inside circumference of the grooves, said method consisting in expanding the ring at such separated portions, prior to its assembly with the clamping devices, into a shape having rounded corners conforming with the curvature of said grooves and having straight sides between said corners; and then assembling such pre-shaped ring with its clamping devices by forcibly maintaining its pre-shaped condition while slipping it over said bolts which maintain its said shape until it has entered the grooves in the clamping devices.

RAMSAY W. WILSON.